United States Patent [19]

Rossell

[11] Patent Number: 4,500,768
[45] Date of Patent: Feb. 19, 1985

[54] ELECTRODE MOUNTING SUPPORT

[75] Inventor: Jame Rossell, Lausanne, Switzerland

[73] Assignee: Rossell Electronique SA, Switzerland

[21] Appl. No.: 339,441

[22] PCT Filed: May 11, 1981

[86] PCT No.: PCT/CH81/00050
§ 371 Date: Jan. 8, 1982
§ 102(e) Date: Jan. 8, 1982

[87] PCT Pub. No.: WO81/03299
PCT Pub. Date: Nov. 26, 1981

[30] Foreign Application Priority Data

May 14, 1980 [DE] Fed. Rep. of Germany ....... 3018426

[51] Int. Cl.³ .............................................. B23K 11/10
[52] U.S. Cl. ................................ 219/86.25; 219/85 G
[58] Field of Search ................ 219/86.25, 86.51, 110, 219/85 R, 85 G; 228/8, 9

[56] References Cited

U.S. PATENT DOCUMENTS

| | | |
|---|---|---|
| 2,179,326 | 11/1939 | Eckman . |
| 2,286,104 | 6/1942 | Platz . |
| 3,234,354 | 2/1966 | Penberg . |
| 3,475,582 | 10/1969 | Cox et al. ............................. 219/119 |
| 3,727,822 | 4/1973 | Umbaugh ............................. 219/110 |
| 4,229,637 | 10/1980 | Dederer et al. ....................... 219/86.25 |

FOREIGN PATENT DOCUMENTS

| | | |
|---|---|---|
| 876 | 3/1979 | European Pat. Off. . |
| 939346 | 1/1956 | Fed. Rep. of Germany . |
| 2657889 | 7/1977 | Fed. Rep. of Germany . |
| 131626 | 7/1978 | German Democratic Rep. ................................ 219/86.51 |
| 423031 | 4/1967 | Switzerland . |

Primary Examiner—Roy N. Envall, Jr.
Assistant Examiner—Alfred S. Keve
Attorney, Agent, or Firm—Lerner, David, Littenberg, Krumholz & Mentlik

[57] ABSTRACT

In order to be able to change, without problems, the characteristic of an intended force measuring device (95, 107 through 123) provided on an electrode mounting support (7), having an electrode holder (81), according to the electrode (105) being used, the mounting support has a mounting part (75) movably fixed to a conveyor carriage (5) of a solder or welding apparatus. Thereon is guided an electrode holder (81) by a ball piston/sleeve arrangement (89, 87) and by an additional piston/cylinder arrangement (87 through 89) acting in cooperation with an exchangeable pressure spring (95) of known characteristic. An inductive displacement pickup, integrated into the second piston/cylinder arrangement, including induction coil (119, 121) is provided on the surface of the cylinder and a ferrite core (125) for cooperating therewith is mounted in the piston. Therefore, with the exchange of the electrodes (105), the changing force can also be corrected for without any adjustments, for example, for equal support pressure, by exchange of the spring (95) or by change of the complete head.

5 Claims, 12 Drawing Figures

FIG.1

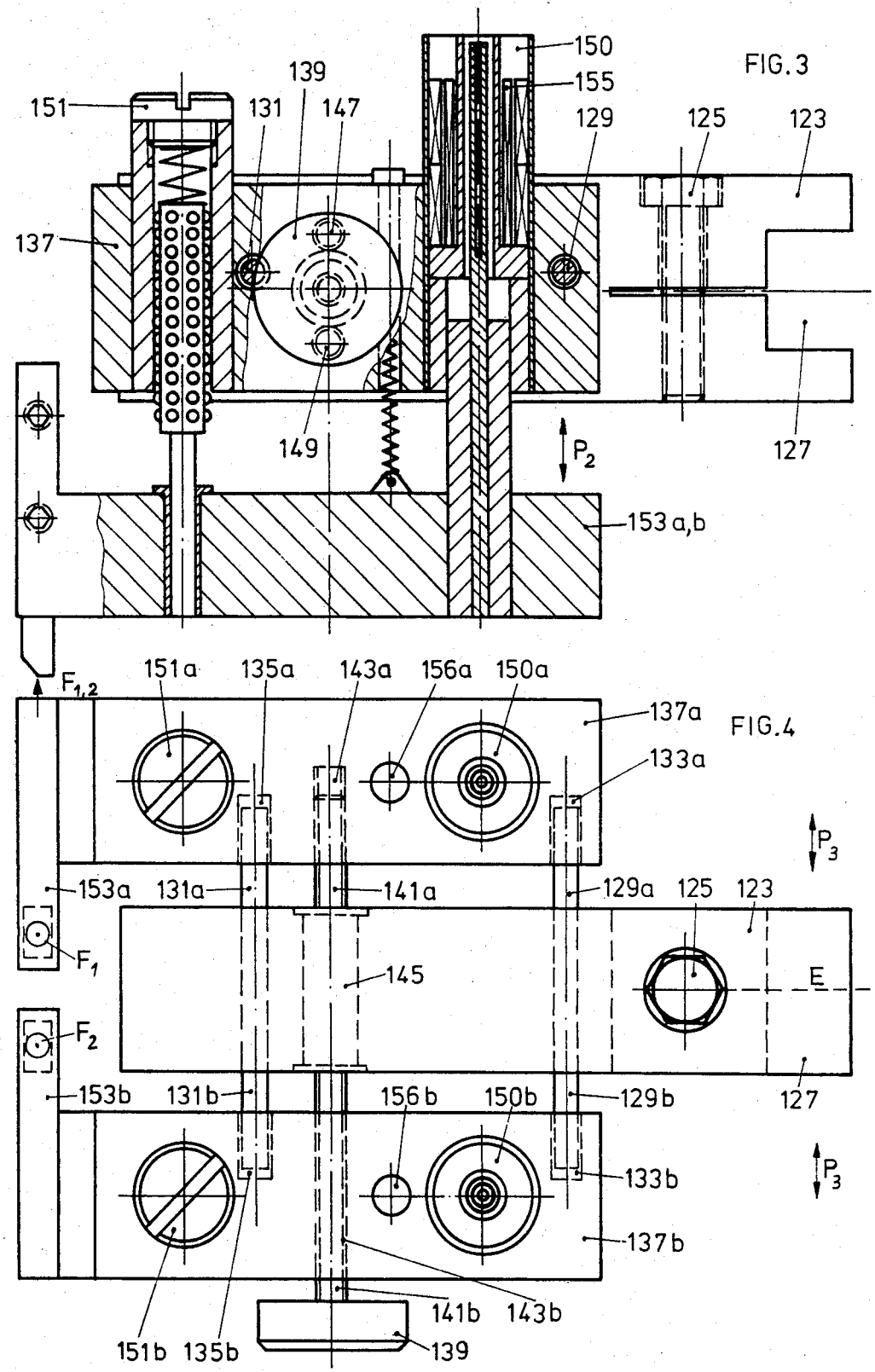

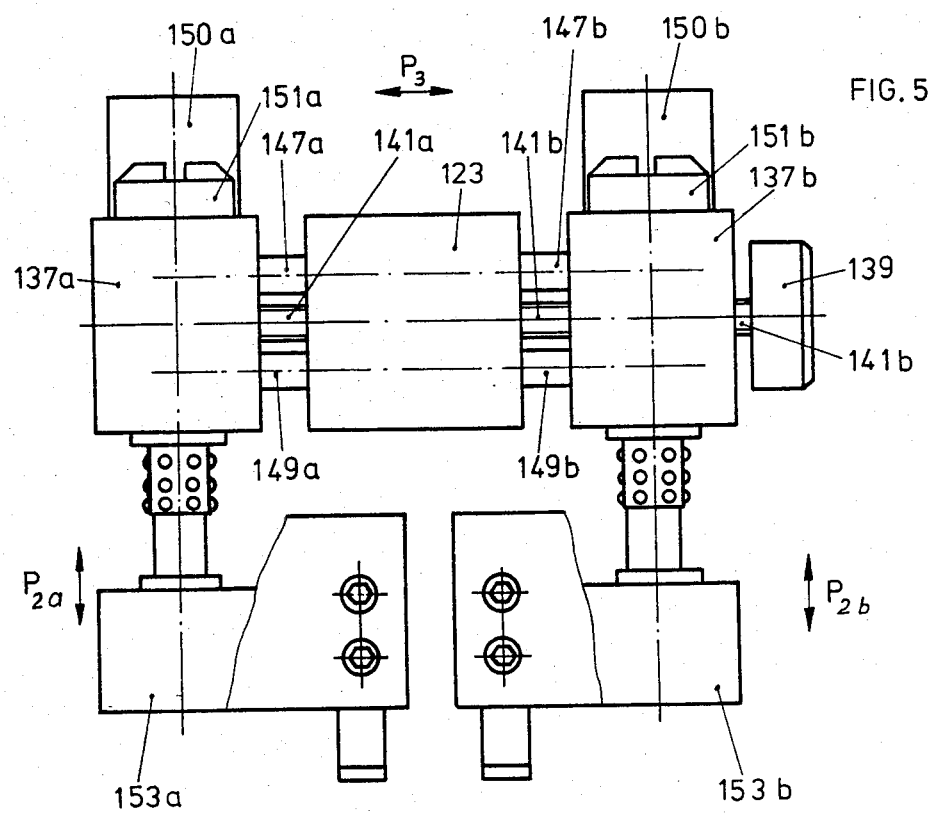

ELECTRODE MOUNTING SUPPORT

The present invention concerns an electrode mounting support for a welding or soldering apparatus, which includes a conveyor carriage including an electrode holder that is vertically movable with regard to the electrode working area and has a force measurement device for measuring the force between the electrode and a workpiece.

PRESENT STATE OF TECHNOLOGY

A welding installation is known from DE-OS No. 27 38 854 which includes a supply sled. This device is powered to move the conveyor carriage and also includes an electrode holder; the latter also being movable lineally with respect to the supply sled. A spring arrangement, between the electrode holder and supply sled, takes up the force between the electrode and the workpiece. The electrode force from the relative displacement of the electrode holder and supply sled can be regulated with the aid of a dial control. With the aid of an adjusting element, the pretension of the spring can be adjusted between the supply sled and electrode holder. This device has a major disadvantage in that different electrodes with different working areas (depending on their use) can be used, but with the changing of the electrodes, requirements for equal pressure have to be taken into account and the operator might take a correspondingly altered reading or change the preloading of the spring. This necessitates relatively high skill requirements for the operator.

DESCRIPTION OF THE INVENTION

The aim of the present invention is to create an electrode mounting support of the above-mentioned type in which the electrodes can be changed without any difficulties, and where the operator does not have to consider the regulated force required for different electrodes. This is accomplished by the electrode mounting support being constructed as a removable fixed head in relation to a conveyor carriage, with at least one mounting part movably mounting the electrode mounting to support the conveyor carriage. A force measurement device is disposed between the holder and the mounting part. The force measurement device includes a spring element which can be exchanged by means of a removable support part mounted on the holder or mounting part. When the electrodes have to be exchanged, the whole head with the force measurement device and a specific spring can be exchanged, or in an alternate embodiment, at least the spring element can be exchanged.

Preferably, the holder on the mounting part is guided lineally and vertically to the electrode working area. Therefore, with such a head, the electrodes are brought into contact without any rotational movement being imparted to the workpiece.

As a force measurement device, an intermediate holder and a mounting part is preferably provided along with an inductive displacement pickup acting with a spring arrangement. With a raised electrode, the provision of a spring element between the mounting portion and holder ensures that the holder is maintained in a floating condition with regard to the mounting parts.

Especially for aperture welding electrodes, it is proposed that the mounting part includes at least an intermediate holder which supports an electrode holder whereby the intermediate holder can be regulated on the mounting part parallel to the electrode working area, preferably through linear displacement. As a result, two parts are provided which are movable in the desired direction relative to each other and on each an electrode can be mounted whose distance can be adjusted by the intermediate holder. Preferably, a force measurement device is also placed on the intermediate holder and electrode holder, especially when it is necessary to specifically regulate the force at each electrode, such as with aperture welding electrodes. When two intermediate holders are provided on the mounting part, which can be positioned symmetrically in a direction parallel to the electrode working area by means of an adjusting element, displacing of the electrode symmetrically is possible.

By the use of the mentioned inductive displacement pickup, the result is an extremely compact construction for a mounting support, since the holder, by means of at least one piston/cylinder arrangement, is guided on the mounting part and the inductive displacement pickup is an integral part thereof, preferably with an inductive coil on the cylinder wall and a magnet on the piston.

BRIEF DESCRIPTION OF THE DRAWINGS

The invention is described with examples with the aid of the figures. Shown are.

DESCRIPTION OF THE INDIVIDUAL FIGURES

Figure 1:
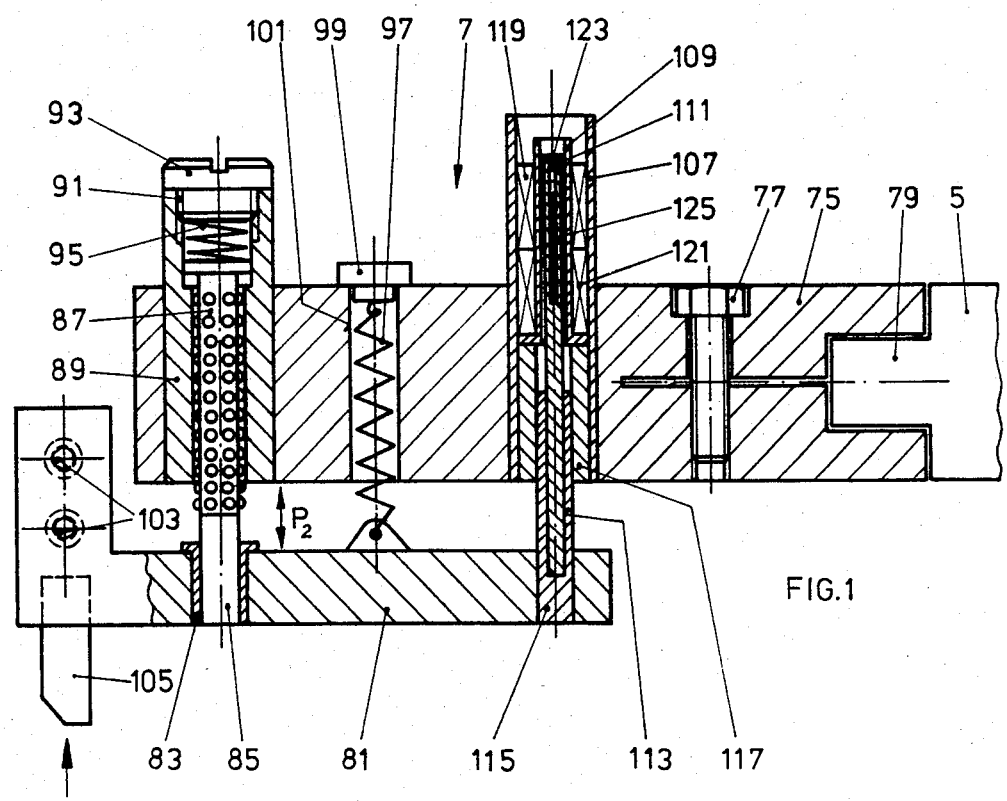
FIG. 1, a cross-sectional view of an electrode mounting support according to the invention, FIG. 2, an end view of the electrode head of FIG. 1, FIG. 3, a partial cross-sectional view of an electrode mounting support for aperture welding electrodes, FIG. 4, an end view of the mounting support of FIG. 3, FIG. 5, a front view of the electrode mounting support of FIG. 4, FIG. 6, a view of an additional, improved variation of an electrode mounting support, FIG. 7, a front view of the mounting support of FIG. 6, FIG. 8, a schematic of a displacement pickup in a bridge circuit for the evaluation of position signals as produced on the electrode heads according t FIGS. 1 through 7, FIG. 9, a schematic of an additional design variation of the bridge circuit of FIG. 8, FIG. 10, a graph of the amplitude of the transfer characteristic curve of a bridge according to FIG. 8 or 9, shown qualitatively, FIG. 11, a graph of the qualitatively shown phase shift of the bridge output signal according to FIGS. 8 and 9, FIG. 12, a graph of the combination of a characteristic curve and the transfer characteristic curve of a displacement pickup as shown, for example, in FIGS. 7 and 8 for the construction of a power receiver characteristic line as realized with the mounting supports according to FIGS. 1 through 7.
Figure 2:
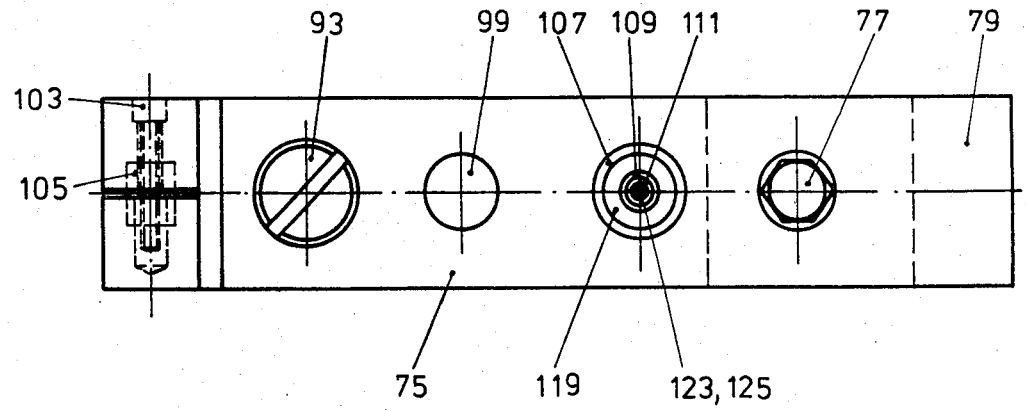

In FIG. 1, an electrode mounting support 7 is shown. The mounting portion 75 includes an adjustable mounting device 79, which can be tightened or loosened by means of a tightening screw 77, for the mounting of the solder or welding device on a supply element or conveyor carriage 5. An electrode holder 81 is mounted by a guide piston 85 which is fastened in a bushing 83 that is formed on one end thereof with the other end thereof including roller bearings forming a ball piston 87 which is movable in a cylinder 89, the latter being rigidly mounted to the mounting portion 75. The guide piston 85 is lineally movable in direction $P_2$. The cylinder 89 includes threads 91 on the upper portion thereof which accommodate a removable screw 93 which serves as a cover. Between the screw 93 and the upper end of the ball piston 87 is disposed a pressure spring 95 whose displacement/force characteristic is known. An additional spring 97, a pull spring, is disposed in a chamber 101 and is fastened on one side thereof in a mounting support 99 and on the other side thereof to the holder portion 81. This pull spring 99 supports the weight of the electrode holder 81 along with a clamped down electrode 105 fixed in position by set screws 103.

An additional cylinder 107 is mounted on the mounting part 75. A guide anchor 111, disposed within the cylinder 107, slides in a coaxial bushing 109 which has an anchor piece on its lower portion, located in a hole 113, which is fastened to support the electrode holder 81. An anchor piece 115, like the anchor 111 in the bushing 109, is guided through the mounting part 75 in a correspondingly dimensioned lower bushing 117. Between the outer wall of the bushing 109 and the inner wall of the cylinder 107 are disposed two coils 119 and 121, which are inserted in a center hole 123 of the anchor 111 and have disposed therethrough a core 125, preferably of a ferrite material. As will be described with the aid of FIGS. 8 and 12, the two coils 119 and 121 and the core 125, which moves relative to the coils 119 and 121 as the electrode holder 81 moves relative to the mounting part 75, form an inductive displacement pickup means, the electrical connections for the coils 119 and 121 not being shown. Basically, the inductive value of the two coils are changed relative to each other through the displacement of the core 125. If, for example, the two coils are connected into an inductive measuring bridge, an indication is given of the relative position of the mounting part 75 and the carrier 81 and therefore the electrode position.

By knowing the spring characteristic of the pressure spring 95, the result is that pressure measurements can be made by the inductive displacement pickup means and the force F can be translated into the pressure which exists between the workpiece and the electrode 105. Therefore, an inexpensive and precise force or pressure measuring device can be realized on the head-shaped mounting support combined with the provided guide.

In FIG. 3 there is shown an embodiment of a head including the already described structure as shown in FIG. 1 but this embodiment is especially modified for aperture welding electrodes. In overview, the embodiment shown in FIG. 3 is configured for symmetrically adjustable aperture welding electrodes as also shown in FIG. 4 and as shown in a front view in FIG. 5. FIG. 3 also is representative of an embodiment for asymmetrically displaced aperture electrodes as further shown in FIG. 6 and in a front view in FIG. 7.

A mounting part 123, again with a mounting support 127 and a fastening screw 125, has on both sides a pair of guide posts 129a, 129b, and 131a, 131b, which are fixed perpendicular to the longitudinal axis of the mounting part 123 and parallel to each other. The guide posts 131 and 129 each slide into guide holes 133a, 133b, and 135a, 135b, each in pairs being disposed in the intermediate holder 137a and 137b. The intermediate holders 137a and 137b are therefore supported with regard to the mounting portion 123 and can be lineally displaced in direction $P_3$. The adjustment of the two intermediate holders 137 is achieved by means of a dial 139, preferably with a planetary speed reduction, common to micrometers, which drives the intermediate holder 137b by means of a threaded rod 141b in a shaft hole 143b whereby the threaded rod 141b is axially fixed, but rotatable in the mounting part 123 and is supported by support part 145. On the other side of the mounting part 123, the support part 145 is continued and cooperates with a threaded shaft 141a, which rests in a threaded hole 143a in the intermediate holder 137a. For the mirror image symmetrical operation of the two intermediate holders 137 with regard to the middle surface E of the mounting part 123, the threads between the threaded rod 141a/threaded hole 143a and the threaded rod 141b/threaded hole 143b are cut in opposite turning directions.

As can be seen from FIG. 3, additional guide posts 147 or 149 are provided on both sides, above and below, the threaded rod 141a, 141b and run in the correspondingly arranged guide holes in the intermediate holders 137a, 137b. Therefore, a guide with just enough clearance of the parts 137 and 123 is provided, the relative position of which can be selected with the aid of an adjusting head 139.

The two intermediate holders 137a, 137b each have an inductive displacement pickup constructed as previously described in regard to the designs of FIG. 1 as a whole, and are designated by 150a and 150b. Provided are a roller piston guide with a pressure spring, each designated as a whole by 151a or 151b. On each intermediate holder 137a and 137b, there is provided an electrode holder constructed and suspended, in the same manner as the similar elements represented in FIG. 1, as a whole designated by 153a or 153b. The pull spring suspension for the spring, similar to the spring 97 of FIG. 1 is designated by 156a or 156b. As can be seen from FIG. 3, an additional coil 155 can be provided so that the whole arrangement, as will be hereinafter described with the aid of FIG. 9, acts as a differential transformer. Consequently the intermediate holders, with regard to the mounting part 123, are symmetrically adjustable in direction $P_3$ according to FIGS. 3, 4, and 5 and the electrode holders 153a or 153b are movable in direction $P_2$, independent of each other with regard to the associated intermediate holders 137a.

With the aid of the two pressure spring arrangements 151a, 151b and the displacement pickups 150a, 150b, each associated with an intermediate holder and electrode holder and each being intended for measuring pressure developed by the associated intermediate holder and the associated electrode holder, the support forces $F_{1,2}$ acting on each of the provided aperture electrodes is detected.

Figure 6:
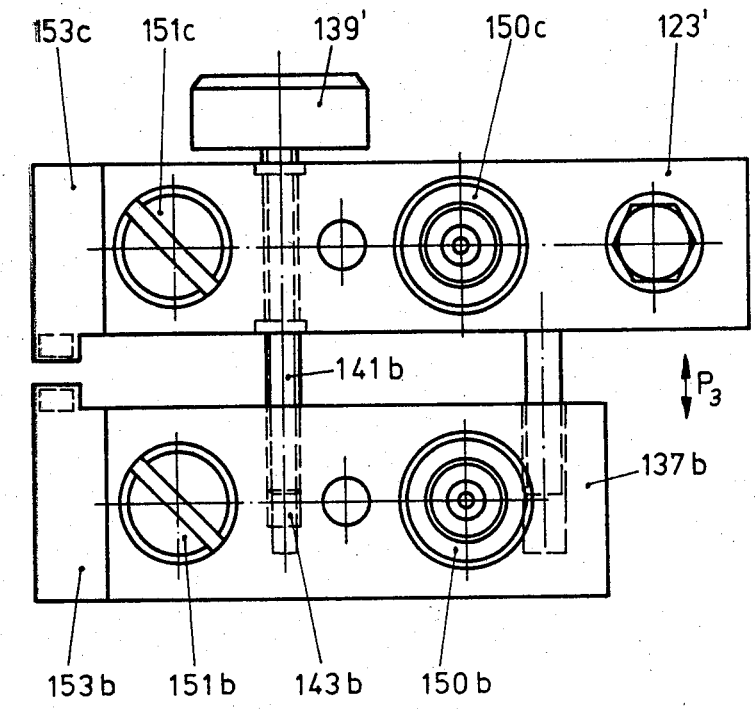
Figure 7:
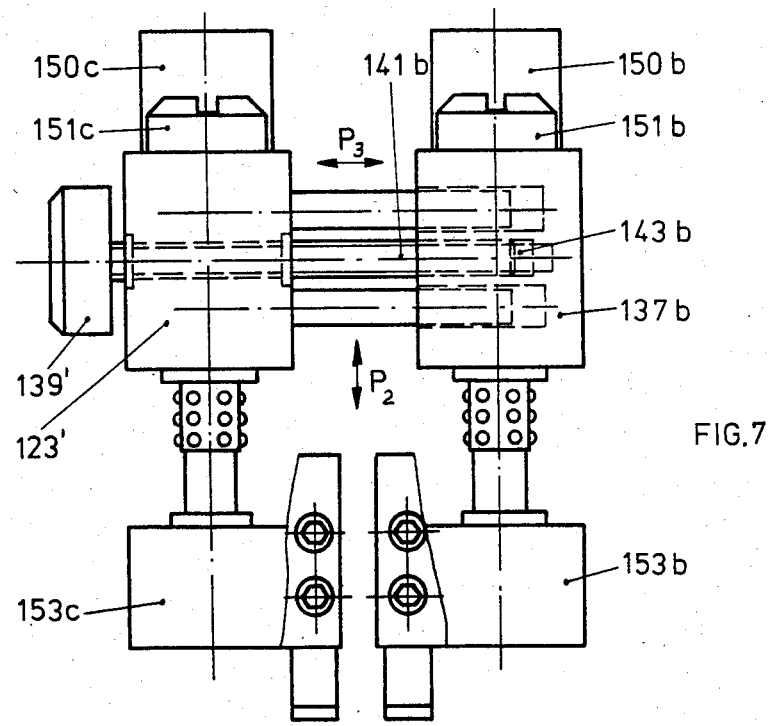

As shown in FIGS. 6 and 7, a second variation of an electrode head is illustrated, designed especially for aperture electrodes. A support part 123', is provided and has only one intermediate holder 137b whereby, as can be seen from this figure, the one electrode holder 153b is connected with the intermediate holder 137b in the same fashion as shown in FIGS. 1 through 5. Since no second intermediate holder 137a is intended according to FIG. 4, the second electrode holder 153c is displaced in direction $P_2$ and is mounted directly on support part 123'. With the aid of the adjusting head 139' and the threaded rod 141b, which engages a threaded sleeve 143b on the intermediate holder 137b, the intermediate holder is displaced in direction P₃ with regard to the mounting part 123'.

Figure 8:
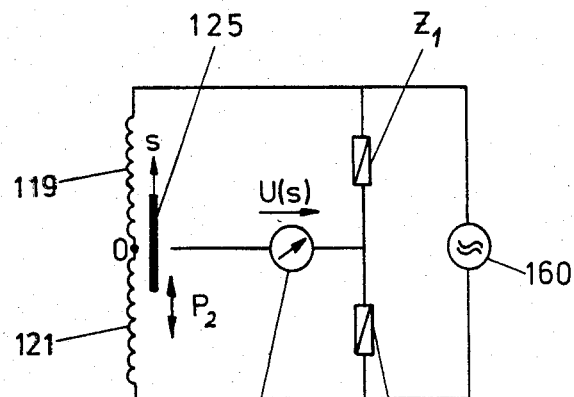

Shown in FIG. 8 is the circuit arrangement provided to measure variation of the inductance of the two coils 119 and 121 as the core 125 moves according to FIG. 1. This arrangement can also be provided between the electrode holder and intermediate holder or support part, according to FIGS. 3, 6, and 7. The two coils 119 and 121 are coupled in an inductive bridge with two additional fixed impedances $Z_1$ and $Z_2$. The bridge is powered by an alternating voltage generator 160. The tap between the two coils 119 and 121 is connected through an adjusting unit 163 with the tap between the two fixed impedances $Z_1$ and $Z_2$. Instead of directly supplying the bridge by the alternating voltage generator it is possible, according to FIG. 9, for example with the apparatus shown in FIG. 3, to connect the output signal of the alternating voltage generator 160 through a primary winding 155, in a transformer fashion, into the bridge by way of the coils 119, 121, and into $Z_1$ and $Z_2$ and the adjusting unit 163. In this case, the two coils 119 and 121 together with the primary coil 155 act as differential transformer. In both design variations, the adjusting unit 163 supplies a signal which indicates the relative position between the core 125 and the two coils 119 and 121, and since the coils are mounted on a support part or an intermediate holder, the adjusting unit supplies an output signal which indicates the relative position in direction P₂ between at least one electrode holder and the mounting support.

Figure 10:
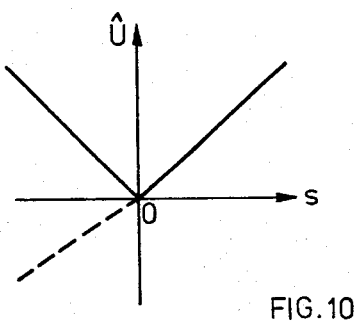

Qualitatively shown in FIG. 10 is an amplitude curve $U(s)$ of the output signal $u(s)$ from the adjusting unit 163 which is generated as a function of the displacement s of the core 125 with respect to the zero position 0 shown in FIG. 8.

Figure 11:
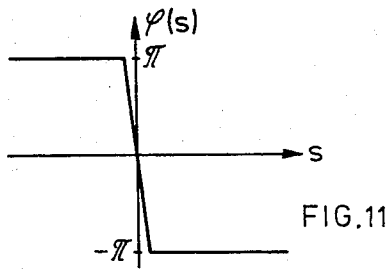

Shown in FIG. 11, qualitatively, is the phase shift $\phi(s)$ of $U(s)$. With the detection of the momentary amplitude $U(s)$ and the phase sign $\phi(s)$ of the mentioned output signal $U(s)$, a definite indication of the mentioned relative position is maintained, shown by a dotted line in FIG. 10.

Figure 9:
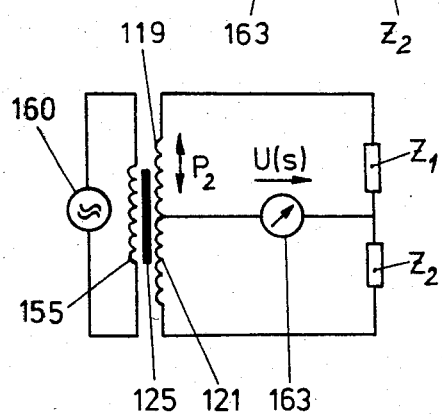
Figure 12:
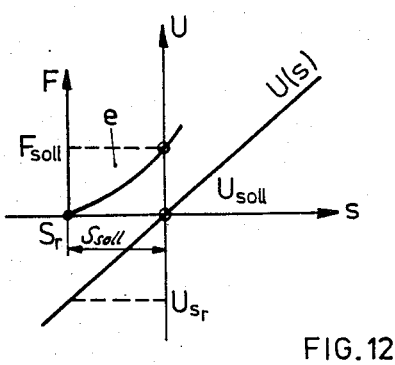

Shown in FIG. 12 is the dependence of force $F_k$ from the distance s between the electrode holder and the intermediate holder and therefore indirectly between electrode holder and the mounting part or from the electrode holder directly with regard to the mounting part. In both cases s corresponds therefore to the relative position of electrode and mounting part. If the one electrode being looked at is at its rest position at $s_r$, the described inductive displacement pickup supplies an output signal according to $U_{sr}$. When the electrode, by the movement of the mounting support, makes contact on a workpiece it will be lifted with its electrode holder against the force of the pressure spring 95 shown in FIG. 1. The reaction force created by the spring 95 follows the example curve shown in FIG. 12 by e. Thereby the output signal of the inductive displacement pickup decreases toward the 0 value. Preferably, the pressure spring is adjusted such that when the electrode goes back by a distance $s_r$, the spring creates a preset pressure or the preset force $F_{soll}$ predetermined for the working radius. Therefore, the electrode arrives at its working position when, on the output of the adjusting unit 163, a zero signal as $U_{Soll}$ appears as shown in FIG. 8 or 9. This output signal can be used as an adjusting value through the predetermined spring characteristic.

In order to consider the different preset forces by the use of different electrodes, the springs will either be exchanged with the electrodes or different heads will be used with the desired corresponding springs.

With the known displacement/force characteristic of the intended springs on the described electrode heads and the provision of the described displacement pickups, a preset displacement signal can be given. Therefore, for a pressure regulation between the intended electrodes and the workpiece, the output signal of the displacement pickup is compared, as an adjustable value, with a preset value which corresponds to the preset displacement and therefore with the preset pressure.

I claim:

1. An electrode mounting support for a welding or soldering electrode comprising:
    a conveyor carriage and an electrode mount, said electrode mount being linearly movably guided on said conveyor carriage relative to an electrode working area; and
    force measuring means including spring means and displacement pickup means, said spring means and said displacement pickup means acting between said conveyor carriage and said electrode mount, said spring means including a spring cavity wherein a spring is mounted, and means for accessing said spring within said cavity for replacement of said spring without affecting said displacement pickup means, said spring means being mounted to exert a force along a line of action displaced from the line of action of said displacement pickup means.

2. An electrode mounting support according to claim 1, wherein said electrode mount is guided by at least two pistons said spring means being mounted at one end of one of said pistons and said displacement pickup means being mounted adjacent the second of said pistons.

3. An electrode mounting support according to claim 2, wherein said displacement pickup means comprises an induction coil disposed around the second piston and a magnet core within the second piston.

4. An electrode mounting support according to claim 1 further comprising supporting second spring means between said conveyor carriage and said electrode mount to support said mount.

5. A method for adjusting the work force acting between an electrode and a workpiece to accommodate different electrode requirements in an apparatus which includes a spring means for providing said force, and force measuring means including displacement measuring means, said method comprising the steps of:
    selecting a desired electrode for use;
    selecting a corresponding spring means for use, said spring means being predetermined as being suitable for providing a force appropriate for use in conjunction with said electrode;
    replacing a previously positioned electrode and spring means with said selected electrode and said selected spring means and employing the same in combination, employment of said selected spring means causing said force measuring means to be calibrated to said selected electrode.

* * * * *